March 15, 1966 R. L. SNYDER 3,241,126

MAGNETIC SHIFT REGISTER

Filed May 25, 1961 7 Sheets-Sheet 1

INVENTOR
RICHARD L. SNYDER.
BY
Walter J. Adam
ATTORNEY

March 15, 1966 R. L. SNYDER 3,241,126
MAGNETIC SHIFT REGISTER
Filed May 25, 1961 7 Sheets-Sheet 2

INVENTOR.
RICHARD L. SNYDER,
BY
Walter J. Adam
ATTORNEY

INVENTOR.
RICHARD L. SNYDER,
BY
Walter J. Adam
ATTORNEY.

INVENTOR.
RICHARD L. SNYDER,
BY
Walter J. Adam
ATTORNEY.

INVENTOR
RICHARD L. SNYDER,
BY Walter J. Adam
ATTORNEY.

MAGNETIC SHIFT REGISTER

Filed May 25, 1961 7 Sheets-Sheet 6

INVENTOR.
RICHARD L. SNYDER,
BY
Walter J. Adam
ATTORNEY.

March 15, 1966 R. L. SNYDER 3,241,126

MAGNETIC SHIFT REGISTER

Filed May 25, 1961 7 Sheets-Sheet 7

INVENTOR.
RICHARD L. SNYDER,
BY
Walter J. Adam
ATTORNEY.

United States Patent Office 3,241,126

Patented Mar. 15, 1966

3,241,126

MAGNETIC SHIFT REGISTER

Richard L. Snyder, Malibu, Calif., assignor to Hughes Aircraft Company, Culver City, Calif., a corporation of Delaware Filed May 25, 1961, Ser. No. 112,715
2 Claims. (Cl. 340—174)

This invention relates to magnetic information retaining devices and particularly to a mechanically static magnetic system for storing and reading interchangeable information records.

In digital computer operation, permanent storage of a great number of binary information bits is required in addition to internal storage means within the computer. Conventional input and output devices have a primary disadvantage associated with the presence of inertia and a primary disadvantage related to reliability of operation, particularly as effected by dust and dirt. The former disadvantage prevents easy synchronization of electronic systems and the latter causes interference with the utilization of a system in which these devices are employed. Punched tape machines require complicated mechanical operation, are limited to the amount of stored information per length of tape and are relatively slow in operation. Magnetic tape or wire input and output machines retain more information per length of tape but are complicated and are particularly susceptible to dust particles. Further, punched tape and magnetic tape machines do not provide convenient storage and selection of sequences of stored information. Simplified storage and selection of information is available with conventional punched or magnetic coated cards, but these devices store a relatively small amount of information.

A magnetic storage medium that is highly reliable, that stores a great number of bits in a small volume and that is readily removable from the machine so as to have the storage properties of conventional cards would be very desirable and a distinct advance in the art. Further, it would be an advantage if the mediums were easily storable such as in well known filing cabinets or in racks.

The use of a continuous piece of magnetic material as a shifting register has been found to be practical such as described in Patent No. 2,919,432, "Magnetic Device," by Kent D. Broadbent. The shift register of this patent operates by unilaterally propagating a discrete area or zone magnetized to a first polarity within a length of material magnetized to a second polarity. In the device described in this patent, there is a finite maximum length of the magnetic medium because of construction problems so that the amount of stored binary information is limited. A simplified and reliable storage system for a large amount of information utilizing the principle of propagating magnetized regions and utilizing a storage medium that is interchangeable and easily storable would be an advance to the art.

It is therefore an object of this invention to provide a simplified and easily constructed storage means for permanently and reliably retaining a large amount of information in a relatively small and compact space.

It is a further object of this invention to provide an information storage system which utilizes storage records that are mechanically independent of the electrical controlling system and are easily removable for external storage from the system.

It is another object of this invention to provide a register that stores binary information as the magnetic state of discrete zones in a wire and which shifts the zones from one end of the wire to the other in an ordered sequence of operation.

It is still another object of this invention to provide a mechanically static system for storing and reading large amounts of binary information in a magnetic medium.

It is another object of this invention to provide a serial mechanically static system for the storage of binary information wherein the rate of transfer of information is controllable at any desired speed below a limiting maximum.

Briefly, in accordance with this invention, a magnetic storage system includes a storage record having a plate with a continuous magnetic medium attached thereto and with the record positioned in a receptacle during operation. The record is easily removable from the receptacle for external storage. The receptacle is surrounded by a phase driving conductor array and by write and read heads appropriately positioned at opposite ends of the magnetic medium. In the sequence of operation, a reference bit of fixed magnetic polarity and an information bit of a selected magnetic polarity are alternately written into the wire as magnetic domains or portions of magnectic domains. A four period driving cycle energizing a two phase winding or armature provides continuous and equal serial movement of the magnetic domains from the write head to the read head.

The novel features of this invention, as well as the invention itself, both as to its organization and method of operation, will best be understood from the accompanying description taken in connection with the accompanying drawings, in which like characters refer to like parts, and in which.

Figure 1:
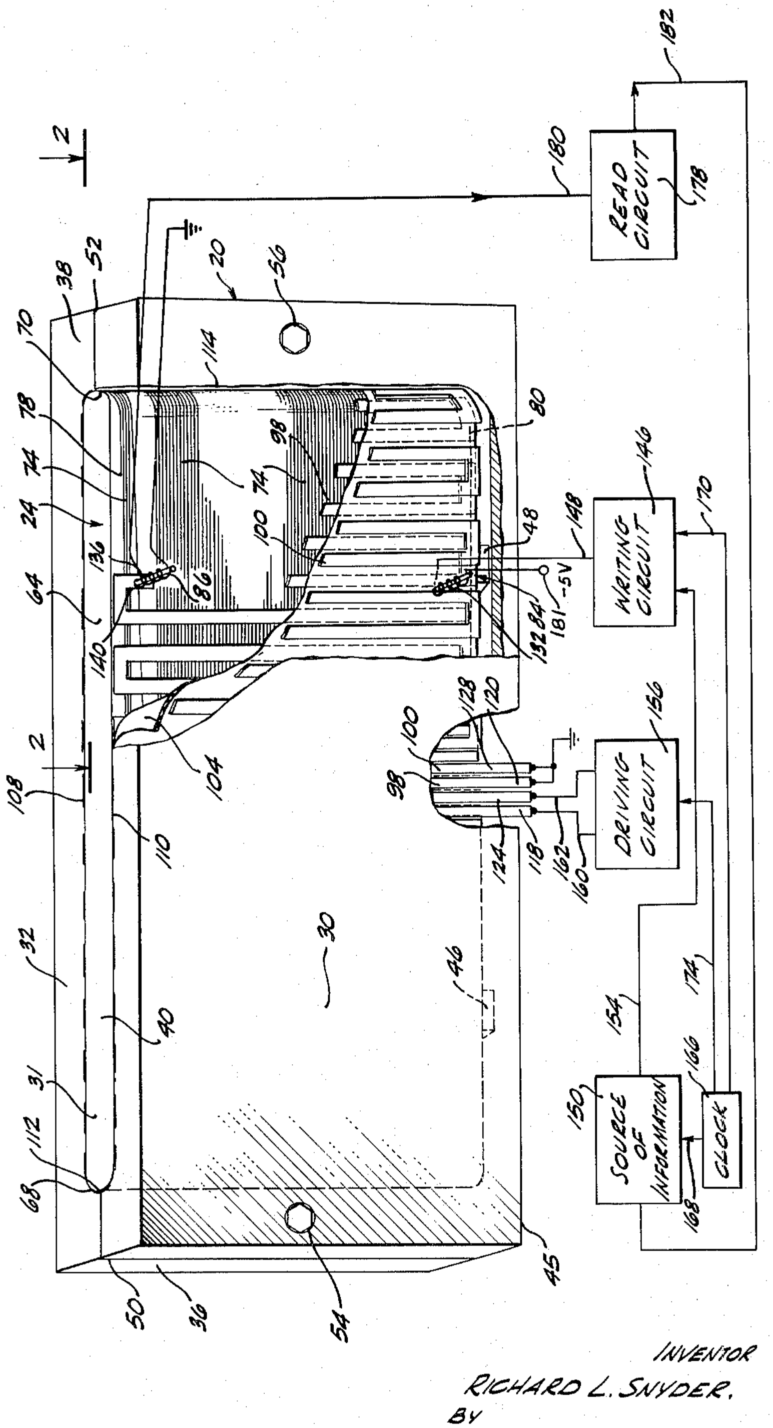
FIG. 1 is a block and perspective diagram partially broken away of the storage system including the removable record in accordance with this invention.

Referring to the perspective drawing of FIG. 1, a frame 20 is provided to hold a storage record 24 which is readily removable therefrom for being replaced by similar storage records. The frame 20 includes first and second flat sides 30 and 32 and first and second ends 36 and 38 which have a selected curvature at the inner surface thereof. At the top of the first and second sides 30 and 32 is a slot or opening 31 for removing and inserting the storage record 24 into an aperture or cavity 40 formed by the sides 30 and 32 and the ends 36 and 38. At a bottom 45 of the first and second sides are stops 46 and 48 mounted between the sides 30 and 32 for retaining the record 24 at a fixed position in the cavity 40. The frame 20 is constructed of a suitable material such as plastic and the sides 30 and 32 may be separable at 50 and 52 with bolts such as 54 and 56 provided for retaining the two sides together.

Figure 2:
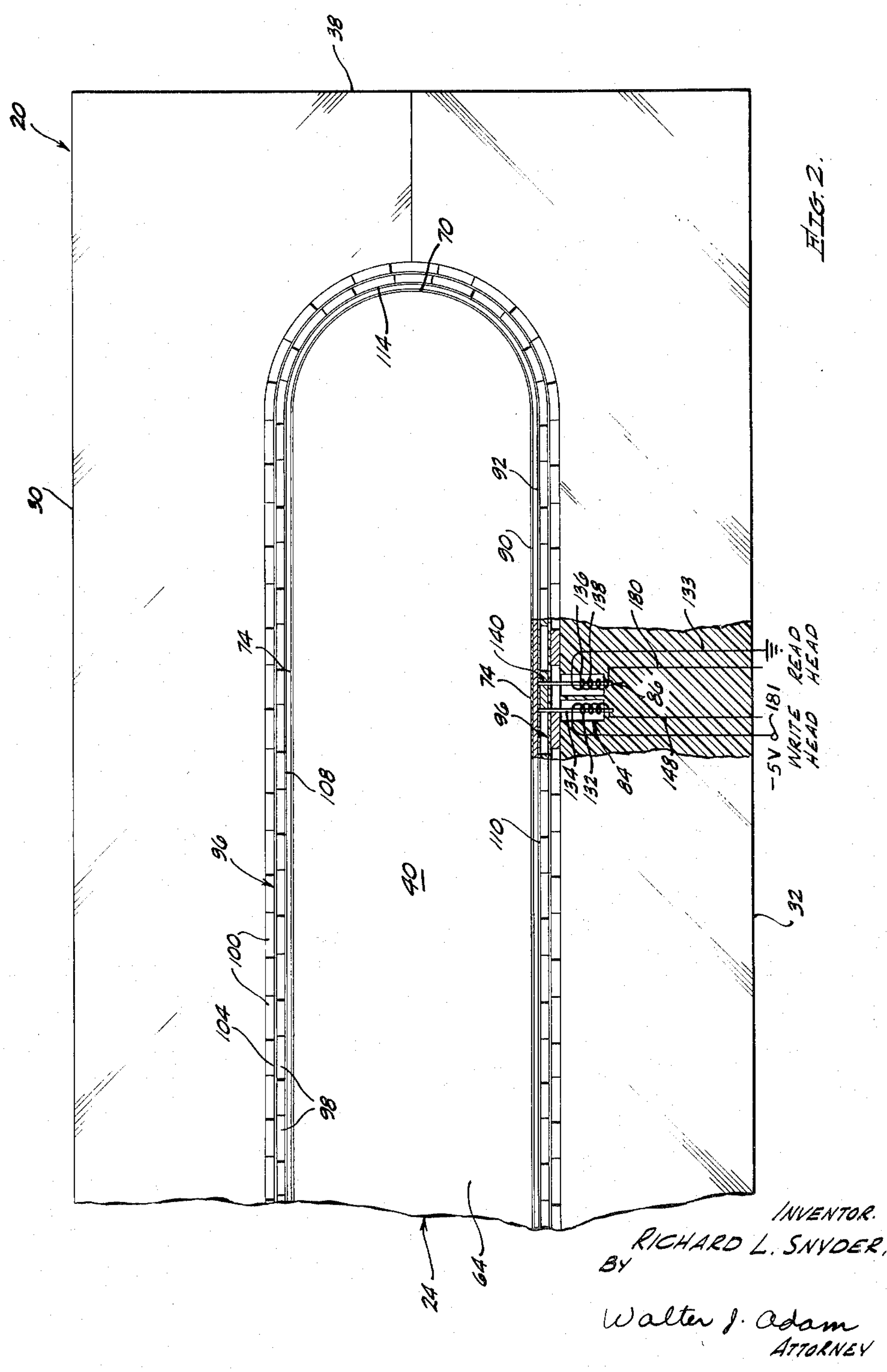
FIG. 2 is a diagram of a section of the storage system of FIG. 1 taken at lines 2—2 of FIG. 1 for further explaining the structure thereof.

Before further explaining the arrangement of the fixed structure or frame 20, the interchangeable storage record 24 will be further explained by also referring to the section of FIG. 2. A plate 64 of a rectangular shape is provided with ends 68 and 70 rounded with a radius equal to one half of the plate thickness. The plate 64 which functions as a structural member and as a shield for driving fields may be of a suitable conductive material such as aluminum or titanium. As will be discussed subsequently, the tension of a magnetic wire 74 must be selected and retained so that the wire exhibits desired magnetic characteristics. Thus, titanium for the plate 64 with a similar coefficient of expansion to nickel-iron wire when used for the wire 74 has been found to be highly desirable. The magnetic wire 74 is wound around the plate 64 from an input end 78 to an output end 80. Magnetic domains, whose polarity is determined by the current in a record head 84 that is subject to binary input information, are propagated in the sequence of which they are recorded through the wire 74 by means of polyphase advancing fields. As the ordered domains pass down the wire 74, the poles formed at the boundaries thereof can excite a reading head at any position such as exciting the read head 86. The wire 74 may be of any suitable type having magnetic properties with relaxing rectangular hysteresis loops, that is, loops with which substantially more magnetomotive force is required to provide establishment of magnetic domains in a material than is required to propagate the magnetic domains. The material maintained under stress in accordance with this invention is a rectangular loop material in the sense that a field strong enough to establish nucleation (that is to form a domain in a region of material parallel to the direction of magnetic orientation which is initially uniformly magnetized in the opposite direction) will cause domain wall motion which in a conventional low frequency loop tracer apparatus will present a rectangular hysteresis loop. It is to be understood that the propagation, which follows nucleation, requires much less magnetomotive force than is indicated by a rectangular loop. A necessary condition in accordance with this invention is that the domain wall movement be affected by much lower fields than that required to establish nucleation, because if it were otherwise, the propagating fields which should only move walls would also be strong enough to establish new domains and destroy the information. With a material having a true rectangular hysteresis loop, that is, one in which a slight increase in magnetomotive force is required to continue switching the material at all points along the curve where the induction is increasing in the direction of the applied field, there could be no discrimination between the field required to propagate an information domain and that required to establish one because the same field strength is required to develop both nucleation and propagation. The loop provided by the wire oriented by being maintained under strain or stress may generally have the shape of the letter I with the B or flux density axis through the vertical axis of the letter and the H or magneto-motive force axis at right angles thereto. At constant values of B+ and B— the loop is parallel to the H axis extending to relatively large nucleation values of H+ and H—. The loop then moves from these nucleation values inward to points close to the B axis and connects by lines substantially parallel to the B axis. As is well known in the art, the portions of a hysteresis loop after nucleation, that is, between the two portions substanially parallel o the H axis at positive and negaive values of the fiux density B, is a measure of the magneto-motive force required to sequentially roll the molecular gyros along the medium or propagate a domain wall thereto .

The hysteresis loop in accordance with the invention, which is a relaxing rectangular loop, may be described as having sharp decreases in field strength or magneto-motive force in the regions of changing between positive and negative flux densities or between flux densities of opposite sign. Thus the wire material in accordance with this invention requires considerably more magneto-motive force to establish a magnetic domain than is required to cause a domain wall already established to move. The orientation of the magnetic elements allows propagation with a relatively small driving field.

The hysteresis loop displayed by a low frequency loop tracer acting on the oriented wire displays a rectangular loop in the direction of orientation which is the easy axis of magnetization because the material resists switching until a nucleating field is reached which is many times that required to move the walls. The walls then move at their maximum velocity and it appears that an instantaneous switching occurs. It is to be noted that the oriented wire in accordance with this invention exhibits a curved or rounded hysteresis loop with a higher frequency hysteresis loop tracer apparatus. Thus, in accordance with the invention, the magnetic wire is maintained under stress such as tension to provide magnetic orientation along the longitudinal axis of the wire, that is, the magnetization at all points in the material except at domain walls is magnetized in a direction parallel to the axial direction of orientation in the absence of an externally applied field. This orientation in accordance with the invention provides the required loop characteristic in which the establishment of a domain wall in a uniformly magnetized region requires considerably more magneto-motive force than is required to cause a domain wall already established to move. A wire of one mil thickness and of a nickel-iron alloy with 60 to 73 percent nickel has been found to be satisfactory.

As discussed above, it has been found that when the wire 74 is a conventional nickel-iron wire, the wire 74 must be retained under a stress such as tension slightly less than the elastic limit in order to exhibit suitable and reliable magnetic orientation properties during propagation of the domains along the wire 74. With magnetic materials for the wire 74 having positive magneto-strictive characteristics, that is, a material that increases its length along the longitudinal axis or the easy direction of magnetization when magnetized, the material has consistently desirable propagation properties when under a strain developed by tension or torsion in the easy direction of magnetization. When the wire 74 is of a negative magneto-strictive material, that is, a material in which the length of material decreases in the easy direction of magnetization when magnetized, strain developed by a compression in the easy direction of magnetization consistently provides the improved storage and propagating characteristics in accordance with this invention. The nickel-iron wire discussed above has been found to have desirable magnetic properties for maintaining magnetic orientation, that is, an orientation so that the magnetic fields are parallel to the axis of the wire, when retained under a tension of between 30,000 pounds per square inch and 80,000 pounds per square inch. It is also believed that rolling and tempering of the magnetic wire may cause the tension requirements to be less critical. It is to be noted that the principles of this invention are not limited to wires of a selected type or retained under a selected tension but also includes any suitable magnetic material having the required magnetic properties. For example, it is believed that a molybdenum-permalloy wire could be developed that would operate satisfactorily. It is also to be recognized that the principles of the invention includes deposited thin film magnetic materials which have been found to exhibit desirable properties.

In one arrangement of the invention, a thin layer 90 (FIG. 2) of magnetic material is formed on the surfaces of the plate 64 and may be a mixture of iron particles and an adhesive material such as shellac. This material 90 provides a flux path of low reluctance so that less flux is absorbed by the shielding plate 64 when a magnetic orientation is established in the wire 74 and less internal magneto-motive force must be provided by the wire to maintain a given flux pattern. The wire 74 is firmly held in position by a suitable sealing material 92 such as shellac or lacquer.

For propagating magnetic domains along the wire 74, a two-phase armature driving arrangement 96 is provided at the edge of the cavity 40 adjacent to the sides 30 and 32 and the ends 36 and 38. A first continuous conductor 98 and a second continuous conductor 100 are each positioned and attached on opposite sides of an insulating mounting sheet 104 which may be of any suitable nonconductive material such as mylar or flexible glass. The conductor 98 is then firmly attached to the sides 30 and 32 and the ends 36 and 38 by a suitable retaining material such as glue. Thus, the cavity 40 of the frame 20 has inner side surfaces 108 and 110 and curved end surfaces 112 and 114 of dimensions to hold the record 24 in position but to allow records such as 24 to be easily interchanged.

The conductor 98 extends continuously in segments from a first end 118 to a second end 120 and the conductor 100 extends continuously in segments from an end 124 to 128. Each conductor 98 and 100 extends at right angles to the wire 74 from the end of the plate 64 adjacent to the bottom 45 of the frame to the end adjacent to the slot 31 with the conductor 98 leading the conductor 100, for example, and then back to the end of the plate 74 adjacent to the bottom 45 with the conductor 100 leading the conductor 98. This sequence is continuous around the surface 110, the end 114, the surface 108 and the end 112. It is to be noted that when the thickness of the plate 64 is relatively small compared to the width of the conductors 98 and 100, the conductors may be curved at the end surfaces 112 and 114.

The conductors 98 and 100 may be square as shown or may be any suitable shape. Also, the conductors 98 and 100 may be of a suitable conducting material such as aluminum.

The record head 84 may include a coil 132 wound around an elongated ferrite block 134 extending between two adjacent segments of the conductors 98 and 100 to the surface 110 above the wire 74 at substantially the end 80 thereof. It is to be noted that the wire 74 at the position of the record head 84 has a diagonal direction similar to that shown at the read head 86 in order that the ferrite block 134 may be relatively wide so that the position of the record 24 in the receptacle 40 is less critical. The read head 86 may include a coil 136 wound around a ferrite block 138 positioned through a hole 140 of the conductor 98 to the surface 108 above the wire 74 near the end 78 thereof. The wire 74 is also wound in a diagonal arrangement as shown at the read head 86 to allow a relatively wide ferrite block 138 to be utilized so that an operator is reasonably sure of seating the record 24 in the receptacle 40 in an operating position. The record head 84 and the read head 86 are fixedly maintained in enclosures in the side 32 of the frame 20 by a suitable retaining material such as shellac. For removing the record 24 form the frame 20, a suitable ejecting mechanism (not shown) may be provided at the bottom 45 thereof.

It is sometimes convenient to locate the read-out or reproduce head in such a position that the coil thereof may have voltage induced therein from the propagating or driving fields. The effects of this coupling may be cancelled by providing an identical head so situated that it is not coupled to a magnetic wire and to connect the coil in this head in series opposition to the coil in the active head.

The system of the invention as shown in FIG. 1 further includes a writing circuit 146 coupled through a lead 148 to one end of the winding 132 of the record head 84, the other end being coupled to a —5 volt terminal 181. A source of information 150 which may be a conventional computer system applies binary signals through a lead 154 to the writing circuit 146. A driving circuit 156 applies alternating driving signals through leads 160 and 162 to ends 118 and 124 of respective conductors 98 and 100, the other end of which may be coupled to ground. A four cycle clock 166 for synchronizing the operation of the system applies signals to the source of information 150 through a composite lead 168, to the writing circuit 146 through a composite lead 170 and to the driving circuit 156 through a composite lead 174. A read circuit 178 receives output signals through a lead 180 coupled to the winding 136 of the read head 86, the other end of the winding 136 being coupled to ground. The read circuit 178 may apply output signals through a lead 182 to the source of information 150 to be processed or to be recirculated back into the storage record 24.

Figure 3:
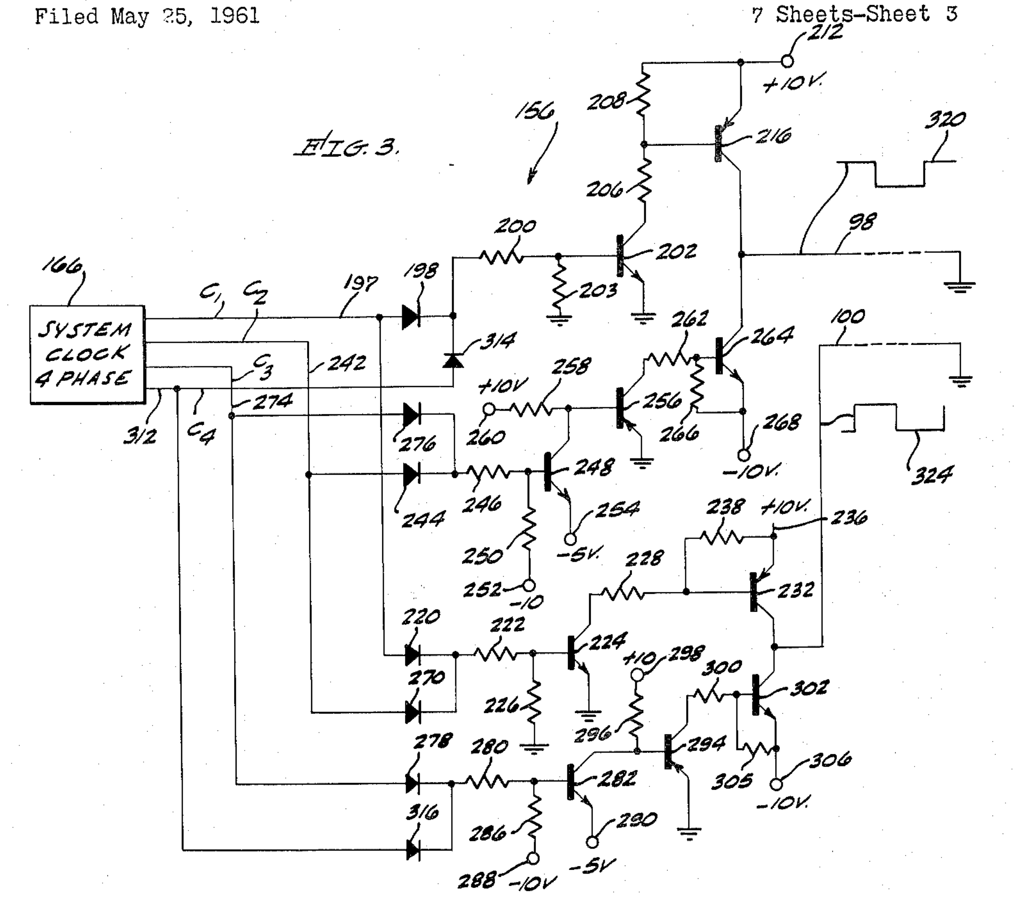
FIG. 3 is a schematic circuit diagram of the two phase armature driving circuit utilized in the system of FIG. 1.

The driving circuit 156 of FIG. 3 responds to the clock 166 which has a four period timing sequence for controlling the driving arrangement of the invention. For explaining the driving operation, the conductors 98 and 100 are shown diagrammatically in FIG. 4 cut at a position above a segment of the magnetic wire 74. The direction of current flow in the conductors 98 and 100 will for convenience be represented as + flowing through the conductor from the cut portion and as — flowing from the conductor to the cut portion. Magnetic driving fields are developed at the wire 74 corresponding to the direction of current flow in the conductors 98 and 100. At a time $T_1$ as shown in the timing sequence of FIG. 4, a segment $\mathbf{98}_1$ of the conductor 98 has a positive current therein, a segment $\mathbf{100}_1$ of the conductor 100 has a positive current, a segment $\mathbf{98}_2$ of the conductor 98 has a negative current and a segment $\mathbf{100}_2$ of the conductor 100 has a negative current therein, so that the current directions are shown as +, +, — and —. The current directions in segments $\mathbf{98}_1$, $\mathbf{100}_1$, $\mathbf{98}_2$ and $\mathbf{100}_2$ at time $T_2$ are —, +, + and —, at times $T_3$ are —, —, + and +, at time $T_4$ are +, —, — and + and at time $T_1'$ the same as at time $T_1$. Thus, each pair of positive currents and each pair of negative currents move one conductor position to the right at each timing interval. To further explain the change of current direction, all segments of each of the conductors 98 and 100 change current direction during alternate times. As will be explained, this change of current and field provides movement of magnetic domains in the wire 74 by steps of substantially the width of one conductor.

Figure 4:
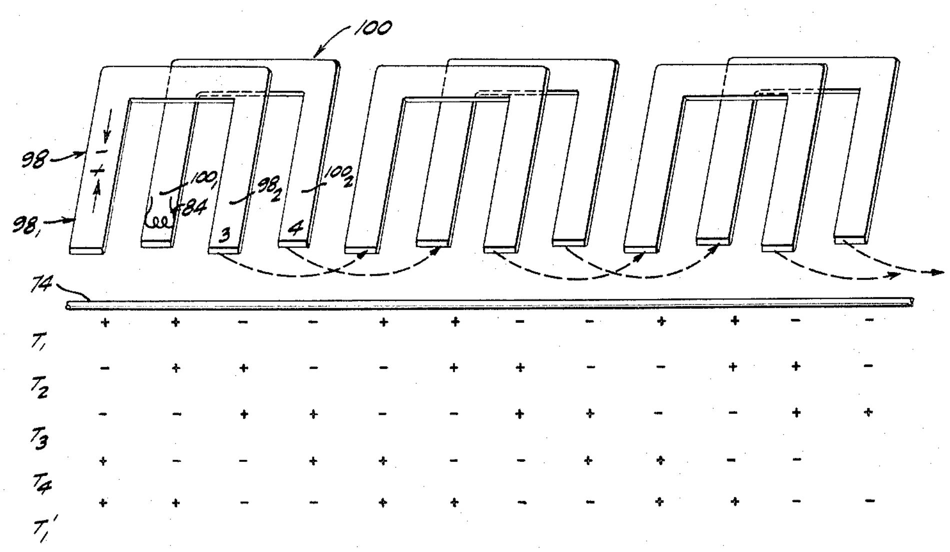
FIG. 4 is a schematic diagram showing the driving sequence of the two phase armature arrangement of the system of FIG. 1.
Figure 5:
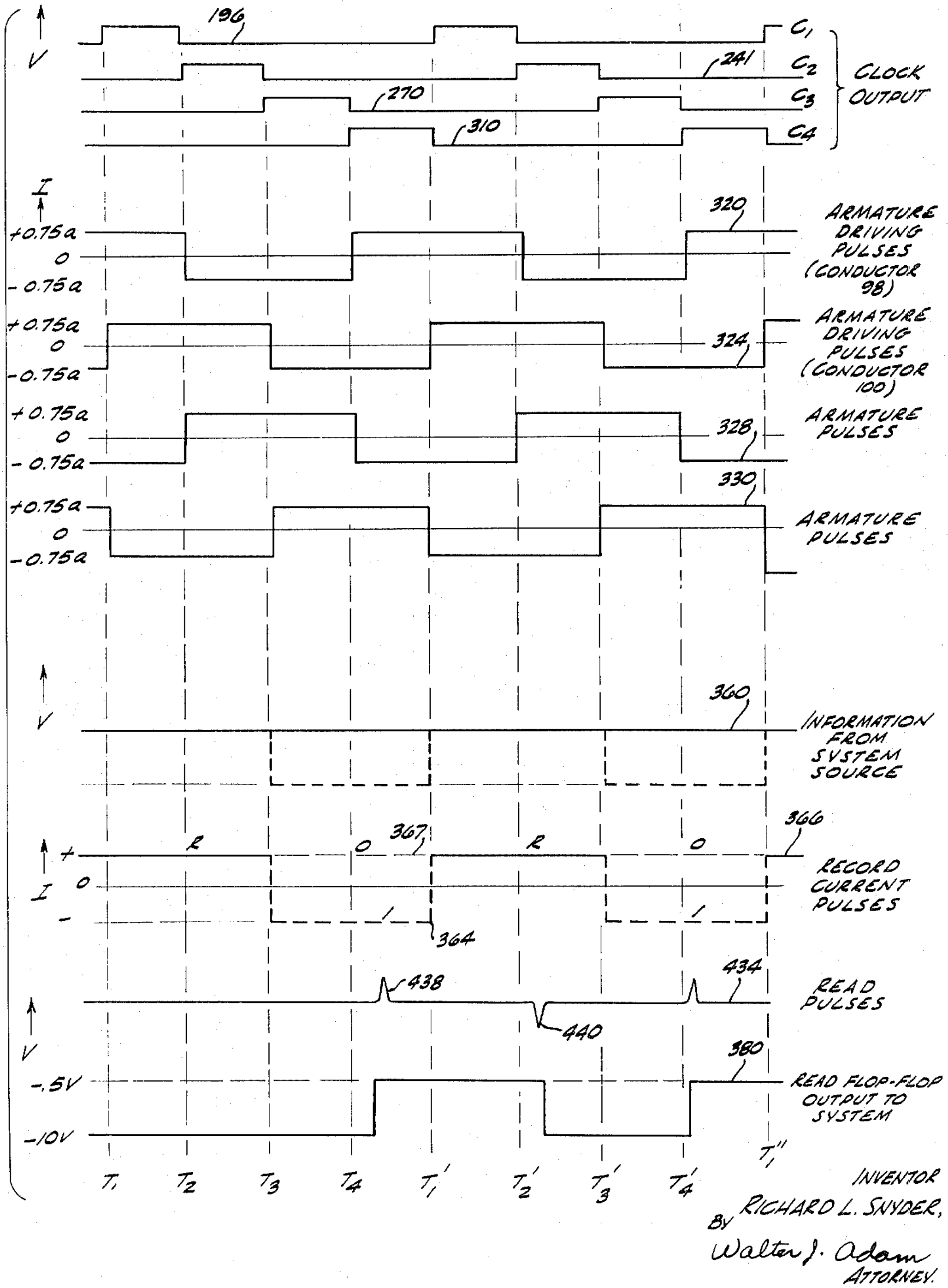
FIG. 5 is a schematic diagram of waveforms for explaining the operation of the system of FIG. 1.

The circuit of FIG. 3 applies the sequence of alternating driving current signals shown in FIG. 4 to the ends 118 and 124 of the conductors 98 and 100. A first clock pulse $C_1$ shown by a waveform 196 of FIG. 5 is applied through a lead 197, through the anode to cathode paths of a diode 198 and through a resistor 200 to the base of an n-p-n type transistor 202. The base of the transistor 202 is also coupled to ground through a resistor 203, the emitter is coupled directly to ground and the collector is coupled through series coupled resistors 206 and 208 to a plus 10-volt terminal 212. The signal is applied from between the resistors 206 and 208 to the base of a p-n-p type transistor 216, of which the emitter is coupled to the terminal 212 and the collector is coupled to the ungrounded end of the conductor 98. The clock signal $C_1$ is also applied from the lead 197 through the anode to cathode path of a diode 220 and through a resistor 222 to the base of an n-p-n type transistor 224. The base of the transistor 224 is coupled to ground through a biasing resistor 226, the emitter is coupled to a ground and the collector is coupled through a resistor 228 to the base of a p-n-p type transistor 232. A plus 10-volt terminal 236 is coupled to the emitter of the transistor 232 and through a resistor 238 to the base thereof. The collector of the transistor 232 applies a signal to the ungrounded end of the conductor 100.

A second clock pulse $C_2$ of a waveform 241 (FIG. 5) is applied from a lead 242 through the anode to cathode path of a diode 244 and through a resistor 246 to the base of an n-p-n type transistor 248. The base of the transistor 248 is coupled through a resistor 250 to a minus 10-volt terminal 252, the emitter is coupled to a minus 5-volt terminal 254 and the collector is coupled to the base of a p-n-p type transistor 256. The base of the transistor 256 is also coupled through a resistor 258 to a plus 10-volt terminal 260, the emitter is coupled to ground and the collector is coupled through a resistor 262 to the base of an n-p-n type transistor 264. The base of the transistor 264 is also coupled through a resistor 266 to a minus 10-volt terminal 268, the emitter is coupled to the terminal 268 and the collector applies a signal to the conductor 98.

The clock pulse $C_2$ is also applied from the lead 242 through the anode to cathode path of a diode 270 and to the resistor 222 and the transistor 224.

A clock pulse $C_3$ of a waveform 270 (FIG. 5) is applied from a lead 274 through the anode to cathode path of a diode 276 and to the resistor 246 and the transistor 248. The clock pulse $C_3$ is also applied from the lead 274 through the anode to cathode path of a diode 278 and through a resistor 280 to the base of an n-p-n type transistor 282. The base of the transistor 282 is also coupled through a biasing resistor 286 to a minus 10-volt terminal 288, the emitter is coupled to a minus 5-volt terminal 290 and the collector is coupled to the base of a n-p-n type transistor 294. The base of the transistor 294 is also coupled through a biasing resistor 296 to a plus 10-volt terminal 298, the emitter is coupled to ground and the collector is coupled through a resistor 300 to the base of an n-p-n type transistor 302. The base of the transistor 302 is also coupled through a resistor 305 to a minus 10-volt terminal 306, the emitter is coupled to the terminal 306 and the collector is coupled to apply a signal to the conductor 100.

The clock pulse $C_4$ of a waveform 310 (FIG. 5) is applied from a lead 312 through the anode to cathode path of a diode 314 and to the resistor 200 and the transistor 202. Also, the clock pulse $C_4$ is applied from the lead 312 through the anode to cathode path of a diode 316 and to the resistor 280 and the transistor 282.

In operation, the transistors of FIG. 3 are nonconductive except in response to specific clock pulses. At time $T_1$ the transistor 202 and in turn the transistor 216 are biased into conduction to develop a positive pulse of a waveform 320. At the same time the transistor 224 and in turn the transistor 232 are biased into conduction to apply a positive pulse representative of the + current direction of FIG. 4 through the conductor 100 and to ground. At time $T_2$ in response to clock pulse $C_2$ of the waveform 241, the transistor 248 and in turn the transistors 256 and 264 are biased into conduction to apply a negative voltage pulse to the conductor 98 indicated by the negative current pulse of the waveform 320 of FIG. 5. Also, at time $T_2$ the transistor 224 and in turn the transistor 232 are maintained in conduction to continue the positive voltage pulse applied to the conductor 100 indicated by the positive current pulse of the waveform 324. Thus, the conditions of FIG. 4 are met at time $T_2$.

At time $T_3$ the clock pulse $C_3$ of the waveform 270 maintains the transistor 248 and in turn the transistors 256 and 264 biased in conduction to apply the negative pulse indicated by the current pulse of the waveform 320 to the conductor 98. At the same time, the transistors 282, 294 and 302 are biased into conduction to apply the negative voltage pulse to the conductor 100 as indicated by the current pulse of the waveform 324. At time $T_4$ the clock pulse $C_4$ biases the transistor 202 and in turn the transistor 216 into conduction to apply a positive voltage pulse to the conductor 98 indicated by the current pulse of the waveform 320. Also, at time $T_4$ the clock pulse $C_4$ is applied through the diode 316 to maintain the transistors 282, 294 and 302 biased in conduction so that the negative current pulse of the waveform 324 is continued. The current pulses of the waveforms 320 and 324 are continually applied to the segments $98_1$ and $100_1$ positioned over the portions of the magnetic wire 74 as shown in FIG. 4 and the current direction reverses in the segments $98_2$ and $100_2$ as shown by respective waveforms 328 and 330 of FIG. 5. The sequence is similar to that discussed above for all segments of the conductors 98 and 100. Thus, during times $T_1$ to $T_4$, the current direction conditions of FIG. 4 for the step by step two phase driving of the domains in the wire 74 is maintained.

Figure 6:
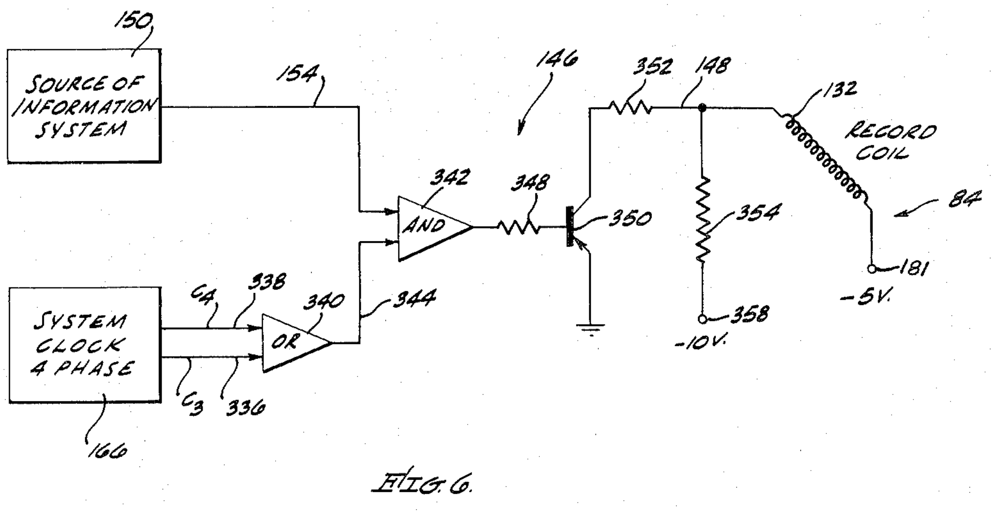
FIG. 6 is a schematic circuit diagram of the record circuit utilized in the system of FIG. 1.

The record or writing circuit 146 as shown in FIG. 6 responds to signals applied both from the source of information 150 and from the clock 166. The clock signals $C_3$ and $C_4$ of the waveforms 270 and 310 (FIG. 5) are applied through leads 336 and 338 of the composite lead 170 of FIG. 1 to an "or" gate 340. An "and" gate 342 responds to clock pulses applied from the "or" gate 340 through a lead 344 and to binary information pulses applied from the source of information 150 through the lead 154. The output of the "and" gate 342 is applied through a resistor 348 to the base of a p-n-p type transistor 350. The emitter of the transistor 350 is coupled to ground and the collector is coupled through a resistor 352 to the lead 148 which in turn is coupled to one end of the winding 132 of the record head 84, the other end of the winding being coupled to the minus 5 volt terminal 181. The lead 148 is also coupled through a resistor 354 to a minus 10 volt terminal 358.

For writing a binary bit into the wire 74 (FIG. 1), an information voltage signal as shown by a waveform 360 of FIG. 5 is applied on the lead 154 to the "and" gate 342. The clock pulses $C_3$ and $C_4$ are also applied to the "and" gate 342. Thus, during the coincidence of the clock pulses and information pulses at times $T_3$ and $T_4$, that is, between times $T_3$ and $T_1'$, an information signal may be applied to the base of the transistor 350. For representing the binary information, a binary "0" is selected as the upper voltage level of the waveform 360 and a binary "1" is selected as the lower voltage level of the waveform 360. Between times $T_3$ and $T_1'$ a voltage level of the waveform 360 representing a "0" does not allow a signal to pass through the "and" gate 342. However, between times $T_3$ and $T_1'$ a voltage level representing a "'1" coincident with the clock pulse $C_3$ or $C_4$ passes a negative pulse through the "and" gate 342 to bias the transistor 350 into conduction. Thus, a record current pulse such as 364 of a waveform 366 passes through the coil 132 in a selected direction to establish a magnetic domain of a predetermined polarity representing a binary "one" in the wire 74.

The normal current flowing from the terminal 181 to the terminal 358 at a current level 367 of the waveform 366 establishes a magnetic domain of a polarity that is selected to represent a binary "zero" state in the wire 74. When the transistor 350 is biased into conduction during the writing of a "one" the current flows through the winding 132 in the opposite direction from that of a "zero" to the terminal 181. It is to be noted at this time that during a portion of the four cycle sequence of operation, a magnetic domain of a reference "R" polarity is recorded on the wire 74 having the same magnetic orientation or polarity as a "zero." Thus, during periods starting with times $T_1$ and $T_2$ when clock pulses $C_1$ and $C_2$ are applied to the driving circuit 156, the current level and direction of the current level 367 is maintained through the winding 132 so that a reference domain is established in the wire 74. It is to be noted that the current levels of the waveform 366 are selected of sufficient level to rapidly establish a magnetic state in the wire 74. Also, the driving current levels of the waveforms 320 and 324 are selected of a level so as to not effect the magnetic orientation established during writing. For example, a current of + and −0.75 ampere as shown by waveform 320, 324, 328 and 330 has been found satisfactory with a ¼-inch conductor width.

Figure 7:
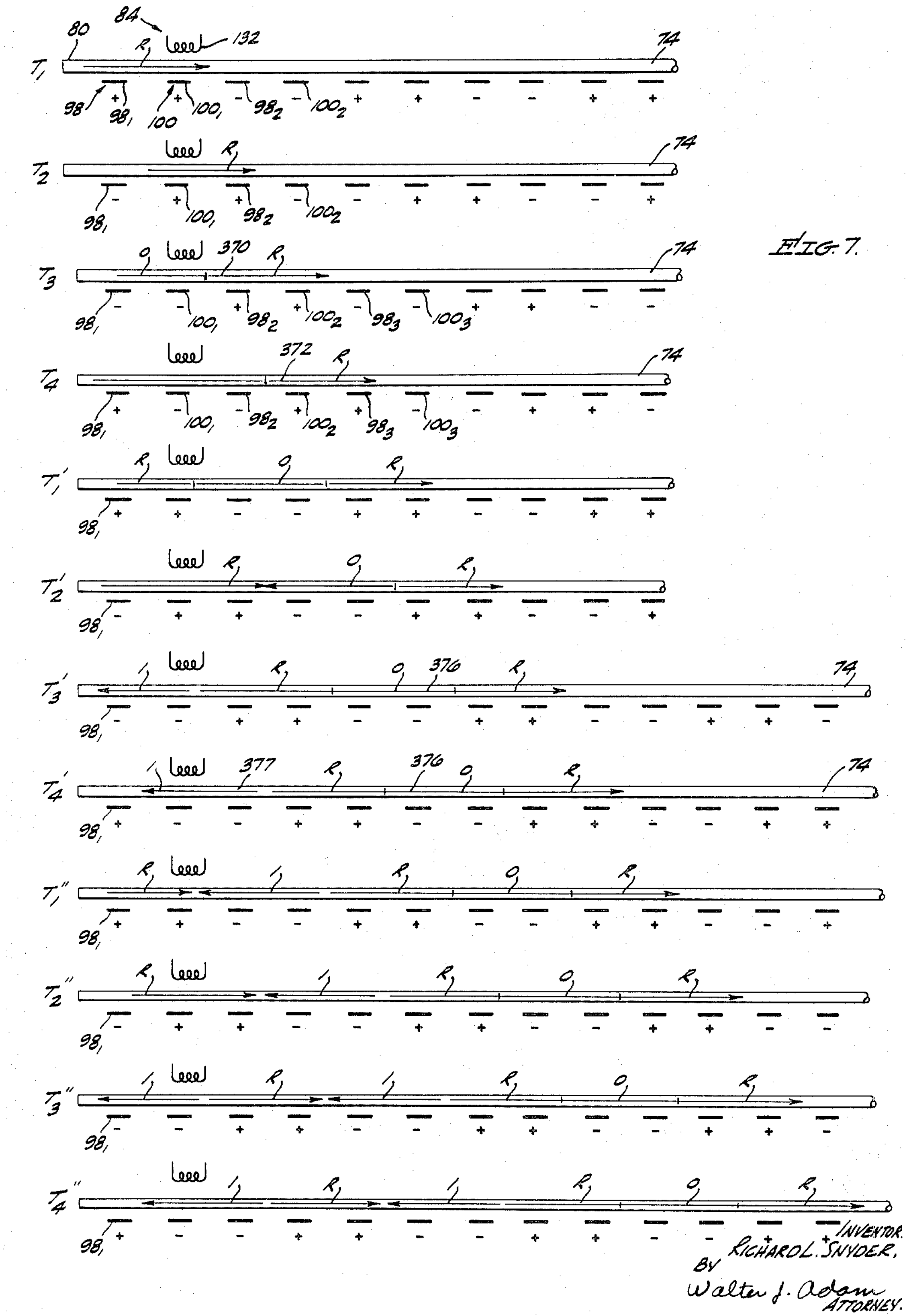
FIG. 7 is a schematic diagram of the magnetic wire utilized in the system of FIG. 1 for explaining the sequence of writing, storage and propagation of magnetic domains having magnetic polarity relations representative of binary information.

Before further explaining the structure of the system of the invention, the sequence of forming magnetic domains and propagating them along the wire 74 in equal steps will be further explained by referring to the diagram of FIG. 7 as well as to waveforms of FIG. 5. At time $T_1$ which is the beginning of the clock pulse $C_1$, the armature driving pulses of the waveforms 320 and 324 develop a positive current in the segment $98_1$ of the conductor 98 and in the segment $100_1$ of the conductor 100 and develop a minus current in the segments $98_2$ and $100_2$ of the respective conductors 98 and 100. Also, the segments such as $98_1$ and $100_1$ of the respective conductors 98 and 100 have a positive current flowing therein at the end 80 of the wire 74 as well as at every portion of the wire 74 passing under those segments. At time $T_1$ a magnetic domain is recorded in the wire 74 having a polarity relation of a "0," that is, with an arrow pointing to the right, to establish a reference domain R. This domain R expands in length until it is held adjacent to the conductor segments $98_1$ and $100_1$. The positive current in the segments $98_1$ and $100_1$ is such to create a common field to augment the state of magnetization in the reference domain. It is to be noted that the driving current is less than required to establish a domain so that once established, the domain is propagated without a change of orientation. Because the conductor segment $98_2$ develops an opposing field to that in the domain, the head of the reference arrow and the domain wall ends at a point between the segments $100_1$ and $98_2$. This condition at time $T_1$ is maintained until time $T_2$.

In response to the rise of the clock pulse $C_2$ at time $T_2$, the armature driving pulse of the waveform 320 changes to a minus current in the conductor segment $98_1$ and the waveform 324 remains a positive current in the segment $100_1$. At the same time, the field developed by the segments $98_2$ changes in response to a positive current and the field in the segment $100_2$ remains the same in response to a negative current. Between times $T_2$ and $T_3$, the record current of the waveform 366 passing through the record head 84 is maintained at the level 367 so that the reference polarity is maintained in the wire 74. The opposing fields of the conductors $98_1$ and $100_2$ move the reference domain forward to a position adjacent to the conductors $100_1$ and $98_2$. It is to be noted that the domain was propagated forward a distance of the width of one conductor or one phase length at time $T_2$.

In response to the rise of the clock pulse $C_3$ at time $T_3$ the segment $100_1$ changes to a negative current, the segment $100_2$ changes to a positive current, and the segment $100_3$ changes to a negative current with the currents in the segments $98_1$, $98_2$ and $98_3$ remaining the same. Assuming a zero is recorded at time $T_3$, the level 367 of the waveform 366 develops a magnetic state similar to the reference arrow which is effectively combined therewith to form an expanded domain 370. Because the current of the waveform 360 is maintained between times $T_3$ and $T_4$, the edge of the domain 370, that is, the tail of the arrow, is held between the conductor segments $98_1$ and $100_1$. The other edge of the domain 370 indicated by the head of the arrow is propagated to a position between the conductor segments $100_2$ and $98_3$ where it is opposed by the field of the segment $98_3$.

In response to the clock pulse $C_4$ at time $T_4$, the conductor segment $98_1$ changes to a positive current, the conductor segment $98_2$ changes to a negative current, and the conductor segment $98_3$ changes to a positive current. As the information writing portion of the cycle continues between times $T_3$ and $T_1'$ a "zero" magnetic state is maintained in the wire 74 as shown by an expanded arrow 372. The head of the arrow 372 or the wall of the expanded domain ends at a position between the conductors $98_3$ and $100_3$. Because the current pulse of the waveform 366 is continuous between times $T_4$ and $T_1'$, the "zero" magnetic state is maintained at the conductor $100_1$. Also, because the conductor $98_1$ is positive, the tail of the arrow 372 extends to the left thereof. It is to be noted that because the field of the domains in the wire 74 are less than the driving field of a conductor, the domain shown by the arrow 372 extends over the negative conductors $100_1$ and $98_2$.

Similar to the discussion above, the sequence of operation continues at times $T_1'$ to $T_4'$. At time $T_3'$ a domain is established of a magnetic polarity representing a "one" shown by an arrow 379 which is opposite to the polarity of the expanded arrow 376 of reference "R" and "zero" magnetic orientation. At time $T_4'$ both the domain of the arrow 377 representing the "one" and the arrow 376 are propagated one step along the wire 74. A similar sequence between times $T_1''$ and $T_4''$ illustrates the recording of another "one" in the wire 74 at times $T_3''$ and $T_4''$. As this writing sequence is similar to that discussed above, the operation between times $T_1''$ and $T_4''$ will not be explained in further detail. Thus, during recording or writing, the information is propagated along the wire 74 at each period in steps substantially equal to the width of a conductor. When more than one magnetic state representing a "zero" or reference "R" are sequentially recorded, an expanded domain is formed and when a one is recorded, a separate domain is established.

Figure 8:
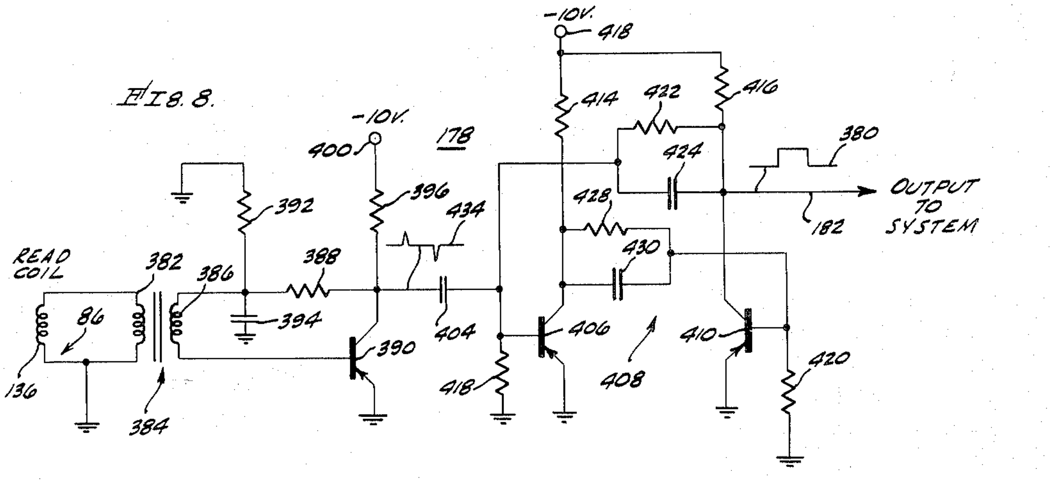
FIG. 8 is a schematic circuit diagram of the read out circuit utilized in the system of FIG. 1.

Referring now to FIG. 8, the read circuit 178 responds to the signals induced in the winding 136 of the read head 86 to apply output pulses of a waveform 380 representing binary information stored and propagated through the magnetic wire 74. The winding 136, which may have one end coupled to ground, is coupled to a first winding 382 of a transformer 384. A second winding 386 of the transformer 384 has one end coupled through a resistor 388 to the collector of a p-n-p transistor 390 and has the other end coupled to the base of the transistor 390. Also, the winding 386 is coupled to ground through a biasing resistor 392 and to ground through a bypass capacitor 394. The emitter of the transistor 390 is coupled to ground and the collector is coupled through a resistor 396 to a minus 10 volt terminal 400. The signal developed on the collector of the transistor 390 is applied through a coupling capacitor 404 to the base of a p-n-p type transistor 406 of a flip-flop 408. The flip-flop 408 also includes a p-n-p type transistor 410 with the emitter of the transistors 406 and 410 coupled to ground and the collectors coupled through respective resistors 414 and 416 to a minus 10 volt terminal 418. The bases of the transistors 406 and 410 are coupled to ground through respective resistors 418 and 420. The base of the transistor 406 is also coupled to the collector of the transistor 410 through a control circuit including a parallel coupled resistor 422 and capacitor 424. In a similar manner the base of the transistor 410 is coupled to the collector of the transistor 406 by a suitable control circuit including a parallel coupled resistor 428 and capacitor 430. The output binary signal of the waveform 380 is derived from the collector of the transistor 410 and applied to the lead 182.

In operation, as the magnetic domains in the wire 74 are propagated to a position adjacent to the read head 86, signals are derived therefrom. As will be discussed subsequently, a "zero" is the absence of an output signal at the read coil 136 and a "one" is sensed by a sequential positive and negative pulse as shown by a waveform 434 of FIG. 5. Thus, during a "zero" condition or the absence of a signal at the coil 136, the transistor 406 is conductive and the transistor 410 is nonconductive so that a minus 10-volt level of the waveform 380 is applied to the lead 182. When a one condition is being interpreted and a positive pulse 436 of the waveform 434 is sensed by the coil 136, the flip flop 408 changes state so that the transistor 406 is biased out of conduction and the transistor 410 is biased into conduction to apply a pulse of the waveform 380 at a level of approximately minus 0.5 volt to the lead 182 indicating a "one." At the occurrence of a negative pulse 440 of the waveform 434 the flip flop 408 changes back to its original state with the transistor 410 nonconductive and the transistor 406 biased into conduction so that the binary "zero" voltage level of minus 10 volts is again applied to the lead 182.

Depending on the speed of propagation of the domains along the wire 74, the pulses 438 and 440 of the waveform 434 are sensed a short time subsequent to times $T_4$ and $T_2'$ or corresponding times of other four cycle sequences. Also, the time of occurrence of the output pulses 438 and 440 is depended upon the position of the read head 86 which may be arbitrarily selected within the principles of this invention.

Figure 9:
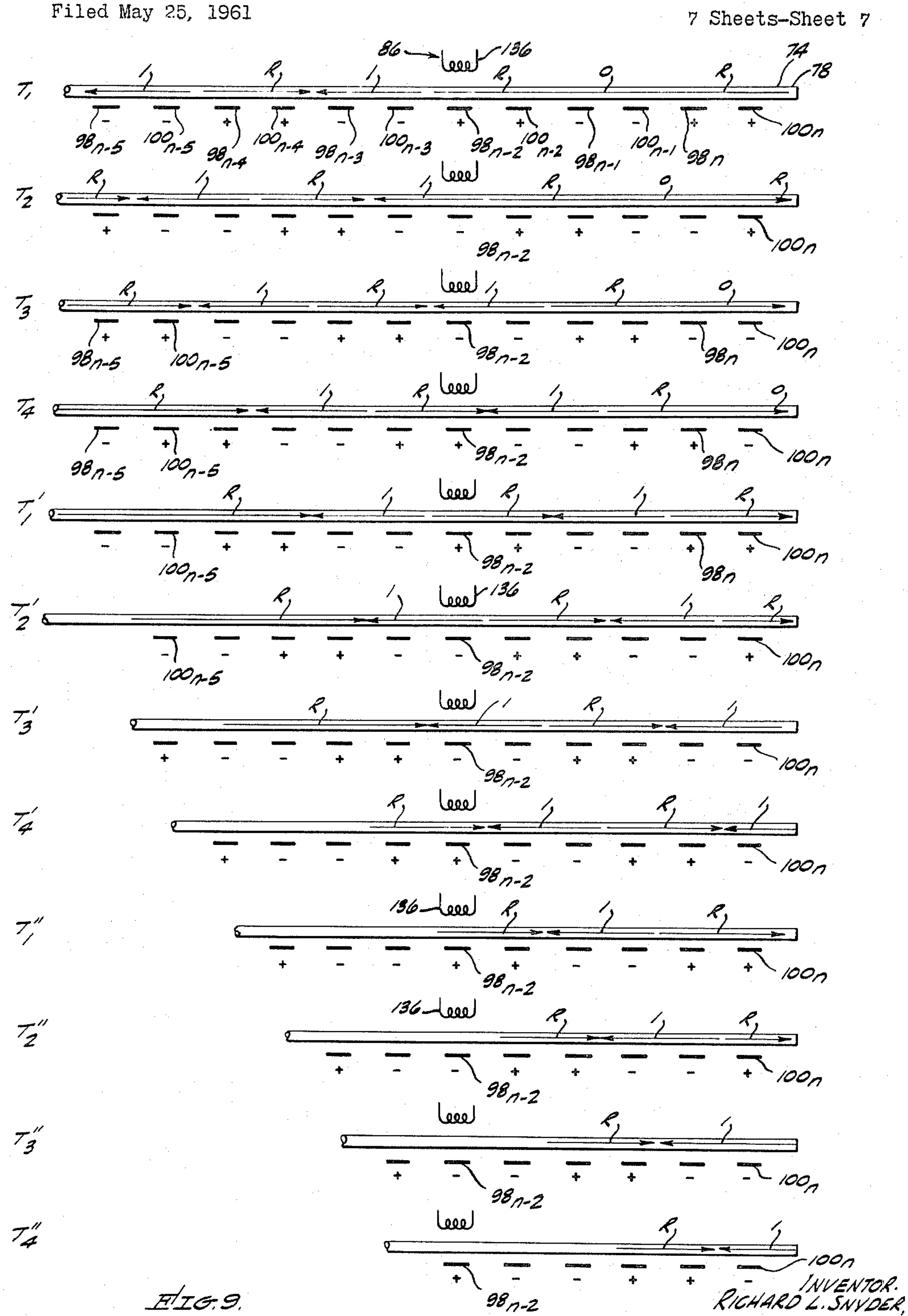
FIG. 9 is a schematic diagram of the magnetic wire utilized in the system of FIG. 1 for explaining the sequence of propagation and reading of the binary information contained in the magnetic domains thereof.

Referring to the schematic diagram of FIG. 9, the read head 86 is shown in a position to correspond to the pulses of the waveform 434. For sensing a "one," the read head 86 develops a positive pulse such as the pulse 438 when a "one" domain moves past the read head followed by a reference domain and develops a negative pulse such as 440 when the moving domains under the head 84 changes from a reference "R" to a "one." It is to be noted that for simplicity the times shown on FIG. 8 representing sequential cycles are shown similar to the times of FIG. 7. It is thus assumed that a similar "011" binary combination written into the wire 74 as explained in reference to FIG. 1 was written therein many cycles previous to time $T_1$. At $T_1$ the zero has been sensed approximately one time period previously to develop the output signal of the waveform 380, and the reference portion of a domain is maintained adjacent to conductors $\mathbf{98}_{n-2}$ and $\mathbf{100}_{n-2}$ in which positive currents are flowing. The subscript *n* represents the number of conductors crossing the wire 74 from the end 80 to the end 78. The domains representing "ones" are adjacent to conductor segments $\mathbf{98}_{n-3}$ and $\mathbf{100}_{n-3}$ and conductor segments $\mathbf{98}_{n-5}$ and $\mathbf{100}_{n-5}$, all of which have negative currents therein. At time $T_2$, all segments of the conductor 98 change current direction and all domains are propagated forward approximately the width of one conductor.

At time $T_3$, all segments of the conductor 100 change current direction and the domains are propagated one more step along the wire 74. At time $T_4$, all the segments of the conductor 98 again change current direction and the domains are propagated one more step along the conductor 74. At time $T_4$, because a one domain changes to a reference domain underneath the read head 84 during the propagation, the positive pulse 438 of the waveform 434 is sensed and applied to the flip flop 408 to develop the positive pulse of the waveform 380. Between times $T_1'$ and $T_4'$ the domains are propagated forward in a similar manner as discussed above. At time $T_2'$, a reference domain moves past the coil 136 of the head 86 followed by a one so that the negative pulse 440 of the waveform 434 is formed shortly after time $T_2'$. Thus, the flip flop 408 is triggered to the opposite state and the output signal of the waveform 380 falls to the low voltage level. It is to be again noted that the pulses 438 and 440 occur subsequently to times $T_4$ and $T_2'$ as determined by the speed of propagation of the domains. Shortly after time $T_4'$ a positive pulse similar to the pulse 438 is sensed by the head 84 as a second "one" is read out.

In a similar sequence the domains are propagated forward along the wire 74 at times $T_1''$ to $T_4''$. Thus, binary information is read from the wire 74 as the domains are continually propagated to the end 78 thereof. It is to be noted that as the magnetic domains are propagated out of the end 78 of the wire 74 they collapse and disappear as the field formed by the conductors 98 and 100 changes direction.

The system of the invention has been operated with minimum domain lengths, that is, the width of two adjacent conductors, of approximately 3/32 inch. A binary "one" of two conductor widths surrounded by a reference magnetic state establishes the minimum domain length. It is believed that by decreasing the conductor width and ferromagnetic wire diameter, minimum domain lengths of .030 inch will store and propagate information satisfactorily. The record 24 of the invention has been operated with a domain length and length of the wire 74 so as to retain 2000 bits of binary information. It is believed that within the principles of the invention that as many as two million bits may be retained on a single 8½ inch x 11 inch record.

Experimental determination of the speed of domain propagation through a one mil diameter iron wire indicates a speed of 1200 feet per second to 3600 feet per second will be attainable in accordance with the invention. It should be noted that the velocity of propagation varies with the amplitude of the driving field and that in a well arranged system, the driving field may be varied over a range of two to one without changing the polarity established in the domains. An advantage of the system in accordance with this invention is that at different times information stored in a record can be recorded and reproduced at different speeds.

Another feature in accordance with the invention is that at the end of a word or block of words, a domain having a "one" polarity may be made more than one domain length by shifting the clock, for example. This technique can be extended to the actual reversal of the polarity of the reference domain and to the interchange of the reference information domains. It is believed that this technique may be particularly useful for storing and providing redundant information.

One feature that provides the high degree of reliability to the system of the invention is that the arrangement of the plate 64 of a conductive material with nonmagnetic properties functions as a shield so that lines of flux force the domains in the wire 74 evenly along the sides and around the ends of the plate. Also, the low reluctance of the coating 90 of ferrite material aids in maintaining the domains as established by the record head 84 and allows relatively short domain lengths to be selected. It is to be noted that the coating 90 improves the system operation, but operation of the system without the coating 90 is also within the principles of the invention.

Thus, there has been described a highly reliable storage system for binary information that is mechanically static. The records are interchangeable so as to provide selection, sorting and transporting of the information. The records have dimensions for convenient storage of large numbers thereof. Because of the compact arrangement, a large amount of binary information may be stored in a single record equivalent to mechanically moving systems such as magnetic wire or tape readers. As a result of the magnetic operation of the system of the invention, the reading of information may be reliably stopped at any bit position. Further, the records of the invention are reusable as many times as desired.

What is claimed is:

1. A magnetic system comprising a mounting frame having an enclosure therein with an external opening, a storage record including a structure of a conductive material having nonmagnetic properties and a magnetic wire having first and second ends, said magnetic wire mounted around and maintained in direct contact with said structure, said magnetic wire maintained under tension to provide magnetic orientation along the longitudinal axis thereof, said wire under tension having a relaxing rectangular hysteresis characteristic such that a substantially greater magnetomotive force is required to establish a magnetic domain wall than is required to propagate the magnetic domain wall along said wire, said storage record having dimensions for being removably positioned in said enclosure, read-in means mounted on said frame and magnetically coupled to the first end of said wire for establishing domains therein having a magnetic orientation of a first or a second direction, a propagating winding mounted to said frame and magnetically coupled to said wire to shift the position of said domains in predetermined steps along said wire, a source of read-in pulses coupled to said read-in means for forming domains with a magnetic orientation in said first direction during first alternate periods and with a magnetic orientation selected in said first or a second direction during second alternate periods adjacent to said first alternate periods, a source of propagating pulses coupled to said propagating winding for applying signals to propagate said domains along said magnetic wire in said predetermined steps, and read-out means mounted on said frame and magnetically coupled to the second end of said magnetic wire to develop information signals in response to domains moving thereby.

2. A magnetic storage system comprising a mounting frame having a substantially rectangular receptacle with a top and bottom and having first and second side and first and second end surfaces, first and second conductors mounted on said first and second sides and first and second end surfaces around said receptacle, said conductors having a plurality of segments extending between said top and bottom alternately in first and second directions, segments of said first conductor preceding segments of said second conductor around said receptacle, a storage record positionable in said receptacle including a plate with a top and bottom, first and second side surfaces and first and second end surfaces, a magnetic wire having first and second ends and wound continuously around and maintained in direct contact with said side surfaces and said end surfaces of said plate so as to extend from the top to the bottom of said plate, said magnetic wire maintained under tension to provide magnetic orientation along the longitudinal axis thereof, said wire under tension having a relaxing rectangular hysteresis characteristic such that a substantially greater magnetomotive force is required to establish a magnetic domain wall than is required to propagate the magnetic domain wall along said wire, a write coil mounted on said frame in a position adjacent to the first end of said magnetic wire when said record is positioned in said receptacle so as to establish magnetic domains therein, a read coil mounted on said frame in a position adjacent to the second end of said magnetic wire when said record is positioned in said receptacle so as to respond to magnetic domains propagated thereby, a source of two phase driving current coupled to said first and second conductors to propagate said magnetic domains along said wire, a source of writing current coupled to said write coil, and reading means coupled to said read coil.

References Cited by the Examiner

UNITED STATES PATENTS

| | | | |
|---|---|---|---|
| 2,620,389 | 12/1952 | Potter | 340—174.1 |
| 2,919,432 | 12/1959 | Broadbent | 340—174 |
| 2,984,825 | 5/1961 | Fuller et al. | 340—174 |
| 3,030,453 | 4/1962 | Moe et al. | 179—100.2 |
| 3,069,661 | 12/1962 | Gianola. | |

IRVING L. SRAGOW, *Primary Examiner.*